United States Patent [19]

Ichikawa et al.

[11] Patent Number: 4,985,378
[45] Date of Patent: Jan. 15, 1991

[54] CARBON-CONTAINING REFRACTORY AND A MANUFACTURING METHOD THEREFOR

[75] Inventors: Kenji Ichikawa, Bizen; Noboru Tsukamoto, Sanyo; Eishi Iida, Bizen; Yuji Yoshimura, Bizen; Junichi Inoue, Bizen, all of Japan

[73] Assignee: Shinagawa Refractories Co., Ltd., Tokyo, Japan

[21] Appl. No.: 240,278

[22] Filed: Sep. 6, 1988

[30] Foreign Application Priority Data

Sep. 21, 1987 [JP] Japan ................................. 62-234795

[51] Int. Cl.$^5$ ............................................. C04B 35/56
[52] U.S. Cl. ........................................ 501/89; 501/90
[58] Field of Search ...................... 501/90, 92, 95, 97, 501/98; 264/65

[56] References Cited

U.S. PATENT DOCUMENTS

| 3,969,124 | 7/1976 | Stewart | 106/56 |
| 4,543,345 | 9/1985 | Wei | 501/95 |
| 4,753,764 | 6/1988 | Kamijo | 264/63 |

FOREIGN PATENT DOCUMENTS

| 0194811 | 9/1986 | European Pat. Off. . |
| 57-27971 | 1/1976 | Japan . |

Primary Examiner—William R. Dixon, Jr.
Assistant Examiner—Deborah Jones
Attorney, Agent, or Firm—Oblon, Spivak, McClelland, Maier & Neustadt

[57] ABSTRACT

A carbon-containing refractory is formed by mixing 1–10 weight % of silicon nitride, 1–35 weight % of carbon, and a remainder of a refractory raw material, molding the mixture into a molded body, and burning the molded body such that fine whiskers of silicon carbide are uniformly distributed within the matrix.

3 Claims, 1 Drawing Sheet

CARBON-CONTAINING REFRACTORY AND A MANUFACTURING METHOD THEREFOR

BACKGROUND OF THE INVENTION

This invention relates to a carbon-containing refractory which can be used for nozzles, plates for sliding nozzles, and other items employed in the continuous casting of molten metals. This invention also relates to a manufacturing method for such a carbon-containing refractory.

Presently, refractories for use in continuous casting are generally carbon-containing refractories which employ oxides such as alumina, silica, or zirconia as a main raw material.

A sliding nozzle is used to control the flow of molten metal during continuous casting, and therefore a refractory which is used for a sliding nozzle must have thermal shock resistance, wear resistance, and high mechanical strength.

At present, the carbon-containing refractories which are primarily used for this purpose are made from a combination of oxide-type raw materials, which have excellent corrosion resistance and wear resistance, and carbon materials, which have excellent thermal shock resistance. As a result, they exhibit excellent properties which were not obtainable with conventional oxide-type burned bricks. However, the sintering of the oxide aggregate in carbon-containing refractories inhibits the formation of ceramic bonds, so the mechanical strength of carbon-containing refractories is lower than that of oxide ceramic bonded refractories.

In order to increase the mechanical strength of carbon-containing refractories, it is common to add metallic Al, metallic Si, or the like and perform burning to form carbide bonds or nitride bonds within the matrix (see Japanese Patent Application Laid Open No. 57-27971). Another method which is employed to increase the mechanical strength is to add to a carbon-containing refractory an oxide having a high vapor pressure at high temperatures, such as MgO or $SiO_2$, and to form oxide-type ceramic bonds such as spinel bonds within the matrix by a vapor-phase reaction (Japanese Patent Application No. 60-52522).

Although the above-described techniques can increase the mechanical strength of a refractory, at the same time they increase the modulus of elasticity, so that the thermal shock resistance coefficient R ends up decreasing, and there is the problem that the thermal shock resistance is degraded.

In general, the difficulty of formation of cracks in a refractory is indicated by the thermal shock resistance coefficient R, which is given by the following formula:

$$R = S(1-\mu)K/E\alpha$$

wherein
S = rupture strength
$\mu$ = Poisson's ratio
K = coefficient of thermal conductivity
E = modulus of elasticity
$\alpha$ = coefficient of thermal expansion Namely, the higher the rupture strength (S) is and the lower the modulus of elasticity (E) is, the better the thermal shock resistance. Therefore, it is desirable to increase the strength of a refractory without an accompanying increase in the modulus of elasticity.

SUMMARY OF THE INVENTION

Accordingly, it is an object of the present invention to provide a carbon-containing refractory having both high mechanical strength and good thermal shock resistance.

It is another object of the present invention to provide a method for the manufacture of such a carbon-containing refractory.

A carbon-containing refractory in accordance with the present invention is obtained by mixing 1-10 weight % of silicon nitride, 1-35 weight % of carbon, and a remained of a refractory raw material, molding the mixture to form a molded body, and burning the resulting molded body, characterized in that the refractory contains fine silicon carbide whiskers which are uniformly distributed within the matrix.

A manufacturing method for a carbon-containing refractory in accordance with the present invention comprises mixing 1-10 weight % of silicon nitride, 1-35 weight % of carbon, and a remainder of a refractory raw material, molding the mixture to form a molded body, and burning the resulting molded body in a non-oxidizing atmosphere in which the partial pressure of nitrogen gas is at most 0.2 atmospheres at a temperature of at least 1300° C.

DESCRIPTION OF THE PREFERRED EMBODIMENTS

Figure 1:
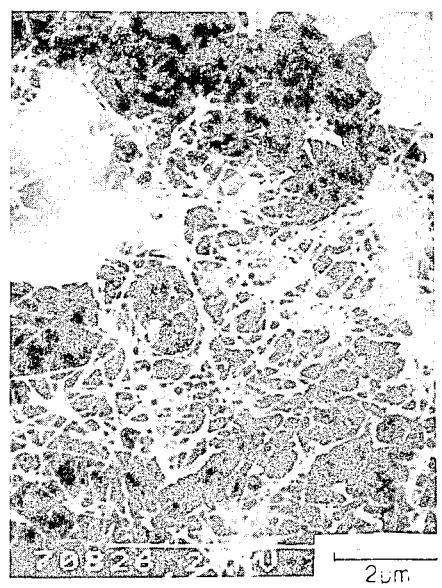
FIG. 1 is a scanning electron microscope photograph of a broken surface of a carbon-containing refractory obtained from Example 1 of the present invention, showing the crystalline structure of SiC.

A carbon-containing refractory in accordance with the present invention is obtained by kneading 1-10 weight % of silicon nitride, 1-35 weight % of carbon, and a remainder of a refractory raw material, molding the mixture to form a molded body, and then burning the molded body at a temperature of at least 1300° C. in a non-oxidizing atmosphere in which the partial pressure of nitrogen gas is at most 0.2 atmospheres to form a refractory. The burning causes the formation of fine silicon carbide whiskers which are uniformly distributed within the matrix. Therefore, there is no decrease in thermal shock resistance such as that caused by carbide bonds and nitride bonds due to the addition of metals or that caused by oxide type ceramic bonds due to the addition of MgO, and a carbon-containing refractory having increased mechanical strength can be obtained.

Generally, in a non-oxidizing atmosphere in which solid-phase carbon is present, the following reaction is conceivable:

$$Si_3N_4 + 3C \rightarrow 3SiC + 2N_2 (g) \qquad (1)$$

At a temperature of 1327° C. (1600 K.), $Si_3N_4$ and SiC can exist in equilibrium when the partial pressure of nitrogen $P_{N2} = 0.221$ atmospheres. If $P_{N2}$ is less than 0.221 atmospheres, the above reaction (1) proceeds to the right, and silicon carbide is formed.

The present invention is based on this knowledge. In the above-described atmosphere having a high temperature and a low nitrogen partial pressure, silicon nitride which is added easily breaks down to form Si(g), SiN(g), SiO(g), $N_2$(g) and similar substances. The resulting gas-phase silicon materials and silicon compounds react with carbon and are deposited as fine whiskers of silicon carbide which are uniformly distributed within the matrix. As a result, the refractory has a strong structure. By forming fine whiskers of silicon carbide by a gas phase reaction uniformly within the matrix, a decrease in thermal shock resistance which is caused by carbide bonds and nitride bonds in the prior art is avoided.

From the standpoint of reactivity, the silicon nitride which is employed in the present invention is preferably a fine powder of no larger than 200 mesh. Its purity is preferably at least 90 weight %.

The carbonaceous raw material can be one or more substances selected from crystalline graphite, earthy graphite, artificial graphite, all types of coke, anthracite coal, carbon black, pyrolytic carbon products of hydrocarbons, and the like.

The refractory raw material can be one or more substances selected from sintered alumina, electrofused alumina, synthetic mullite, various types of clay minerals, fused silica, zirconia sand, stabilized zironia, zirconia mullite, alumina zirconia, quartzite, silicon carbide, and the like. Furthermore, for the purpose of preventing oxidation and increasing strength, a metal such as metallic aluminum, metallic silicon, or ferrosilicon may be added as necessary.

The amount of silicon nitride which is added in accordance with the present invention is preferably 1–10 weight %, more preferably 3–8 weight %, and most preferably 4–8 weight %. If the amount of added silicon nitride is less than 1 weight %, adequate strength can not be obtained, and if it exceeds 10 weight %, the corrosion resistance of the resulting refractory greatly decreases and therefore the life decreases. The amount of the carbonaceous raw material which is added is preferably 1–35 weight %, more preferably 5–30 weight %, and most preferably 10–20 weight %. If the added amount is less than 1 weight %, the desired effects of the present invention can not be expected, and if it exceeds 35 weight %, the mechanical strength greatly deteriorates, and the resistance to oxidation also decreases.

A mixture of raw materials having the above-described composition is kneaded using one or more conventional organic binders selected from phenolic resins, pitch, tar, and the like. The kneaded mixture is then formed into a prescribed shape by press molding, and the molded body is then burned. As explained above, the burning is carried out in a non-oxidizing atmosphere having a nitrogen partial pressure of at most 0.2 atmospheres. The method which is employed to control the atmosphere can be one in which burning is performed in an argon gas stream, or one in which the molded body is burned while embedded in carbon powder. When the latter method is employed, it is important that the sealed vessel in which burning is performed should be made of a fire-resistant material having low gas permeability so that the inflow of air is suppressed and the penetration of nitrogen is prevented. Furthermore, if metallic aluminum powder is mixed with the carbon power, nitrogen is absorbed as AlN and can thereby be controlled. The burning temperature is at least 1300° C.

The present invention will now be described in further detail by means of the following working examples.

Examples

Calcined alumina, synthetic mullite, zircon, alumina zirconia, fused silica, metallic Al powder, metallic Si powder, silicon carbide, a carbonaceous raw material, and silicon nitride were mixed in the proportions shown in Table 1 and were formed by press molding into molded bodies measuring 230×300×50 mm. The molded bodies were burned by the burning methods shown in Table 1 to obtain carbon-containing refractory materials. The properties of the resulting materials are also shown in Table 1.

TABLE 1

|  |  | Present Invention Product | | | | Comparative Product | |
| --- | --- | --- | --- | --- | --- | --- | --- |
|  |  | 1 | 2 | 3 | 4 | 5 | 6 |
| Composition % | Al₂O₃ | 71 | 60 | 50 | 76 | 73 | 70 |
|  | SiO₂ | 15 | 7 | 12 | 10 | 17 | 17 |
|  | ZrO₂ | — | 15 | — | — | — | — |
|  | C | 10 | 12 | 30 | 11 | 10 | 10 |
|  | Si₃N₄ | 4 | 6 | 8 | 3 | — | 3 |
| Burning Conditions | Burning Process In Ar Gas | O | | O | | | |
|  | Carbon Material + Metallic Al | | O | | O | | |
|  | In Carbon Material | | | | | O | O |
|  | Burning Temperature (°C.) | 1350 | 1550 | 1300 | 1500 | 1350 | 1350 |
|  | Burning Time (hr) | | | | | | |
|  | N₂ Gas Partial Pressure (Atm) | <0.2 | <0.2 | <0.2 | <0.2 | >0.2 | >0.2 |
| Properties | Apparent Porosity (%) | 10.0 | 9.8 | 14.1 | 9.5 | 10.5 | 10.1 |
|  | Bulk Density | 3.13 | 3.10 | 2.80 | 3.11 | 3.15 | 3.14 |
|  | Bending Strength (kg/cm²) | 450 | 380 | 150 | 410 | 280 | 270 |
|  | Modulus of Elasticity (kg/mm²) | 6000 | 4800 | 1500 | 5100 | 7200 | 6900 |
|  | Coefficient of Thermal Shock Resistance R' | 12.2 | 15.1 | 45.0 | 14.5 | 7.5 | 7.1 |
|  | Spalling Test | O | O | O | O | X | X |

The spalling test of Table 1 was performed by immersing test pieces measuring 30×30×120 mm in molten pig iron at 1650° C. for one minute to rapidly heat them, removing them, and letting them stand in air to cool, after which the formation of cracks was evaluated. In the table, the symbols have the following meanings:

X ... large cracks, Δ ... small cracks, O ... no cracks

FIG. 1 is a scanning electron microscope photograph of a broken surface of Example 1 of Table 1, illustrating the crystal structure of SiC in a carbon-containing refractory according to the present invention. From this photograph, it can be seen that SiC whiskers are formed within the matrix.

Example 1 of a carbon-containing refractory was used as a plate brick for an actual sliding nozzle. Compared to a conventional plate brick not containing silicon carbide, the amount of wear was enormously decreased, there was no formation of cracks, and the life thereof in actual use was increased by approximately 50%.

As shown by the preceding examples, a carbon-containing refractory in accordance with the present invention has increased bending strength with no increase in modulus of elasticity. Therefore, the thermal shock resistance coefficient and the spalling resistance are increased.

What is claimed is:

1. A method for preparing a carbon-containing refractory comprising:
    (i) mixing 1-10 weight % of silicon nitride, 1-35 weight % of carbon, and a remainder of a refractory raw material selected from the group consisting of sintered alumina, electrofused alumina, synthetic mullite, clay minerals, fused silica, zirconia sand, stabilized zirconia, zirconia mullite, alumina zirconia, and quartzite to form a mixture;
    (ii) molding said mixture into a molded body; and
    (iii) burning said molded body in a non-oxidizing atmosphere having a nitrogen partial pressure of at most 0.2 atmospheres at a temperature of at least 1300° C., to obtain fine whiskers of silicon carbide uniformly distributed within said refractory.

2. The method of claim 1, wherein in said mixing, said silicon nitride is present in an amount of 3-8 weight % and said carbon is present in an amount of 5-30 weight %.

3. The method of claim 1, wherein in said mixing, said silicon nitride is present in an amount of 4-8 weight % and said carbon is present in an amount of 10-20 weight %.

* * * * *